United States Patent
Thierry et al.

(10) Patent No.: US 12,146,391 B2
(45) Date of Patent: Nov. 19, 2024

(54) WELLHEAD CONTAINER FOR A GEOTHERMAL SYSTEM

(71) Applicant: Schlumberger Technology Corporation, Sugar Land, TX (US)

(72) Inventors: Sylvain Thierry, Clamart (FR); Matthieu Simon, Clamart (FR); Cindy Demichel, Clamart (FR); Marco Alioto, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/907,101

(22) PCT Filed: Mar. 26, 2021

(86) PCT No.: PCT/US2021/024432
§ 371 (c)(1),
(2) Date: Sep. 23, 2022

(87) PCT Pub. No.: WO2021/195537
PCT Pub. Date: Sep. 30, 2021

(65) Prior Publication Data
US 2023/0107830 A1    Apr. 6, 2023

Related U.S. Application Data

(60) Provisional application No. 63/000,610, filed on Mar. 27, 2020.

(51) Int. Cl.
*E21B 41/00* (2006.01)
*B65D 88/74* (2006.01)
(Continued)

(52) U.S. Cl.
CPC .............. *E21B 41/00* (2013.01); *B65D 88/74* (2013.01); *B65D 88/76* (2013.01); *F24T 10/10* (2018.05); *E21B 7/02* (2013.01); *F24T 2010/53* (2018.05)

(58) Field of Classification Search
CPC . B65D 88/76; E21B 41/00; E21B 7/02; E21B 43/305; F24T 10/10; F24T 2010/53; F24T 10/00; F24T 2010/50; Y02E 10/10
See application file for complete search history.

(56) References Cited

U.S. PATENT DOCUMENTS 4,971,149 A * 11/1990 Roberts ................. E02D 29/149
166/92.1
5,195,590 A * 3/1993 Kenner ................... E21B 33/03
166/85.1

(Continued)

FOREIGN PATENT DOCUMENTS

| CN | 105971520 A | 9/2016 |
|---|---|---|
| JP | 2001131905 A | 5/2001 |
| WO | 2008034970 A1 | 3/2008 |

OTHER PUBLICATIONS

Bussmann, G. et al., "Geostar—a Scalable Borehole Heat Exchanger Plant for Growing District Heating Systems and Constricted Large Urban Infrastructures" Proceedings World Geothermal Congress 2015 Melbourne, Australia, Apr. 19-25, 2015, 9 pages.

*Primary Examiner* — Brad Harcourt (57) ABSTRACT

A wellhead container for a geothermal system includes a base configured to engage a bottom of a recess within a ground. The recess extends vertically from the bottom of the recess to a surface of the ground, the base includes at least one first opening, and the at least one first opening is configured to receive a drilling string. The wellhead container includes a top configured to support a load applied by a drilling machine to the wellhead container. The top (Continued)

includes second openings, and each second opening is configured to receive the drilling string. The wellhead container includes a sidewall extending along a vertical axis between the base and the top. The sidewall is configured to position an upper surface of the top substantially flush with the surface of the ground, and the sidewall is configured to transfer at least a portion of the load to the base.

15 Claims, 6 Drawing Sheets (51) Int. Cl.
      *B65D 88/76*       (2006.01)
      *F24T 10/10*       (2018.01)
      *E21B 7/02*       (2006.01)
      *F24T 10/00*       (2018.01)

(56) References Cited

U.S. PATENT DOCUMENTS

| | | | |
|---|---|---|---|
| 8,967,273 B2* | 3/2015 | Ray | E21B 47/117 |
| | | | 405/249 |
| 9,556,856 B2 | 1/2017 | Stewart | |
| 2011/0109087 A1 | 5/2011 | Johansson | |
| 2012/0059632 A1 | 3/2012 | Hagedorn | |
| 2014/0299291 A1* | 10/2014 | Stewart | E21B 19/24 |
| | | | 165/45 |
| 2015/0021924 A1 | 1/2015 | Parella, Sr. | |
| 2015/0082713 A1* | 3/2015 | Stanton | E05C 3/045 |
| | | | 52/745.02 |
| 2016/0326842 A1* | 11/2016 | Varney | E21B 41/0021 |

* cited by examiner

WELLHEAD CONTAINER FOR A GEOTHERMAL SYSTEM

CROSS REFERENCE TO RELATED APPLICATION

This application claims priority from and the benefit of U.S. Provisional Application Ser. No. 63/000,610 entitled "Design, System and Method for a Shallow Geothermal Heat Exchanger Made of a Plurality of Non-Vertical Sondes Closely Spaced at Surface Resulting in Minimum Surface Footprint", filed Mar. 27, 2020, which is hereby incorporated by reference in its entirety.

BACKGROUND

The present disclosure relates generally to a wellhead container for a geothermal system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A heat pump system may be used to control a temperature within a building. For example, to increase the temperature of air within the building, the heat pump system may transfer heat from a heat transfer fluid to the air, thereby heating the air. In addition, to reduce the temperature of the air within the building, the heat pump system may transfer heat from the air to the heat transfer fluid, thereby cooling the air. In certain heat pump systems (e.g., ground source heat pump systems, geothermal heat pump systems, etc.), a geothermal system may facilitate heat transfer between the heat transfer fluid and the ground. The geothermal system includes one or more geothermal heat exchangers disposed within the ground. Due to the relatively constant temperature of the ground, the geothermal heat exchanger(s) facilitate heat transfer from the heat transfer fluid to the ground during operations in which the heat transfer fluid is warmer than the ground (e.g., while cooling the building), and the geothermal heat exchangers facilitate heat transfer from the ground to the heat transfer fluid during operations in which the heat transfer fluid is cooler than the ground (e.g., while heating the building).

For larger buildings, the geothermal system may include a large number of geothermal heat exchangers. Each geothermal heat exchanger may be disposed within a respective vertical wellbore, and the vertical wellbores may be separated from one another by a distance sufficient to substantially reduce or eliminate thermal interference between the geothermal heat exchangers. As a result, a large field of geothermal heat exchangers may be used to facilitate heat transfer between the heat transfer fluid and the ground. Unfortunately, relatively dense urban areas may not have sufficient land available for a large field of geothermal heat exchangers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a wellhead container for a geothermal system includes a base configured to engage a bottom of a recess within a ground. The recess extends vertically from the bottom of the recess to a surface of the ground, the base includes at least one first opening, and the at least one first opening is configured to receive a drilling string. The wellhead container also includes a top configured to support a load applied by a drilling machine to the wellhead container. The top includes second openings, and each second opening is configured to receive the drilling string. In addition, the wellhead container includes a sidewall extending along a vertical axis between the base and the top. The sidewall is configured to position an upper surface of the top substantially flush with the surface of the ground, and the sidewall is configured to transfer at least a portion of the load to the base.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

As explained above, for larger buildings, the geothermal system may include a large number of geothermal heat exchangers. Each geothermal heat exchanger may be disposed within a respective vertical wellbore, and the vertical wellbores may be separated from one another by a distance sufficient to substantially reduce or eliminate thermal interference between the geothermal heat exchangers. As a result, a large field of geothermal heat exchangers may be used to facilitate heat transfer between the heat transfer fluid and the ground. Due to the large size of the field, relatively dense urban areas may not have sufficient land available to accommodate the geothermal system.

In certain embodiments, a geothermal system includes multiple geothermal heat exchangers extending into the ground from a relatively small area proximate to a surface of the ground. For example, angled and/or deviated wellbores may be drilled/formed, in which the origins of the wellbores are proximate to one another. A geothermal heat exchanger may then be disposed/inserted into each wellbore. Due to the angled/deviated wellbores, the geothermal heat exchangers diverge from one another as the depth increases. Accordingly, thermal interference between the geothermal heat exchangers may be substantially reduced or eliminated as the depth increases, thereby establishing a geothermal system that effectively transfers heat between the heat transfer fluid within the geothermal heat exchangers and the ground. In addition, because the origins of the wellbores are proximate to one another, the surface area utilized by the geothermal system is substantially reduced (e.g., as compared to a geothermal system in which the geothermal heat exchangers are disposed within vertical wellbores).

Furthermore, in certain embodiments, the origin of each wellbore (e.g., angled wellbore, deviated wellbore, etc.) is positioned at a wellhead container of the geothermal system. The wellhead container includes a base configured to engage a bottom of a recess within the ground, and the recess extends vertically from the bottom of the recess to the surface of the ground. In addition, the base includes one or more first openings, and each first opening is configured to receive a drilling string. The wellhead container also includes a top configured to support a load applied by a drilling machine to the wellhead container. As discussed in detail below, the drilling string is supported by the drilling machine. The top includes a set of second openings, and each second opening is configured to receive the drilling string. Furthermore, the wellhead container includes a sidewall extending along a vertical axis between the base and the top. The sidewall is configured to position an upper surface of the top substantially flush with the surface of the ground, and the sidewall is configured to transfer at least a portion of the load to the base. The wellhead container may enhance the structure of the ground at/near the origins of the wellbores, thereby facilitating the wellbore formation/geothermal heat exchanger installation process. In certain embodiments, the sidewall is configured to substantially block flow of fluid from the wellhead container to the ground. For example, drilling fluid injected into each wellbore during the wellbore formation process may be collected within the wellhead container and transferred (e.g., continuously transferred via a pump) to a storage container (e.g., tank of a truck), thereby substantially reducing or eliminating collection of drilling fluid within/on the ground.

Figure 1:
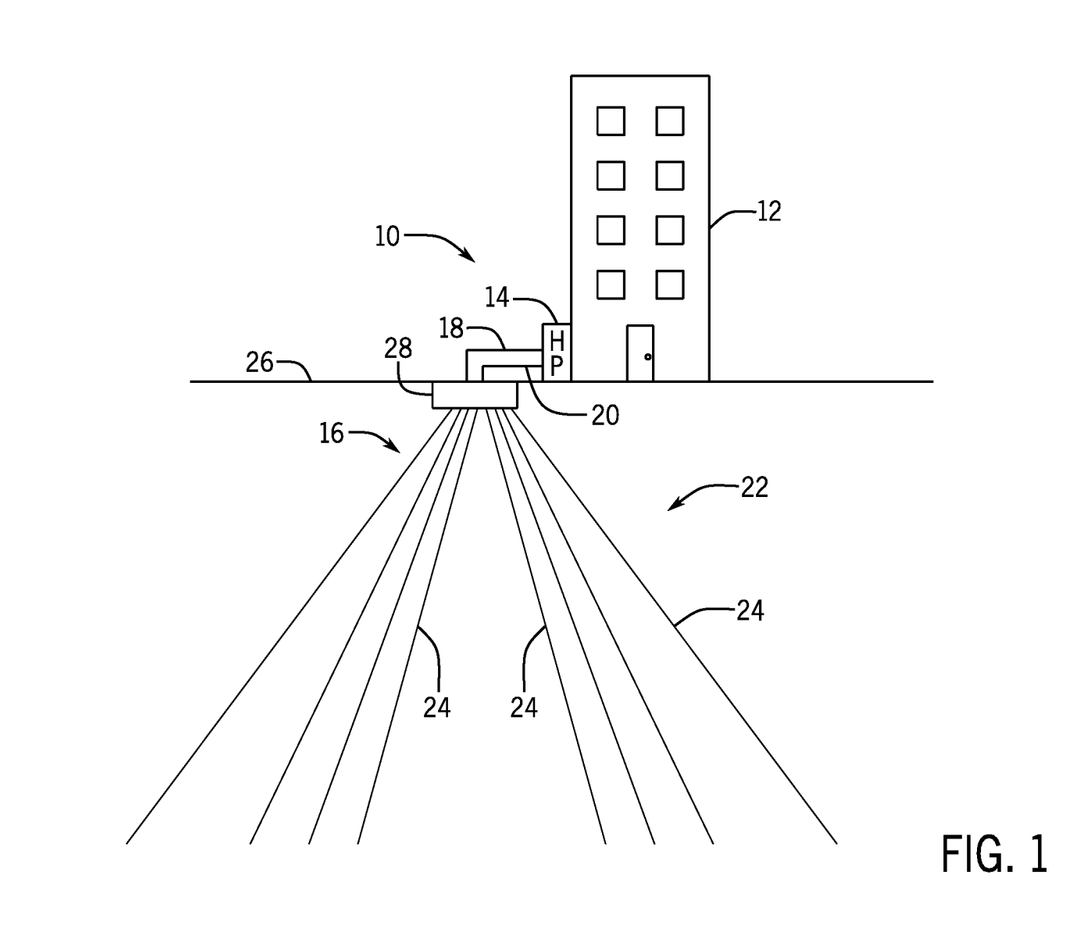
FIG. 1 is a schematic diagram of an embodiment of a heat pump system that may be used to control a temperature within a building.

FIG. 1 is a schematic diagram of an embodiment of a heat pump system 10 that may be used to control a temperature within a building 12. In the illustrated embodiment, the heat pump system 10 includes a heat pump 14 and a geothermal system 16. The heat pump 14 is configured to control a temperature within the building 12, and the geothermal system 16 is configured to provide heat transfer fluid to the heat pump 14 and to receive the heat transfer fluid from the heat pump 14. For example, to increase the temperature of air within the building 12, the heat pump 14 may transfer heat from the heat transfer fluid to the air, thereby heating the air. Transferring heat from the heat transfer fluid to the air reduces the temperature of the heat transfer fluid. The cooler heat transfer fluid flows into the geothermal system 16 via an inlet conduit 18, and the geothermal system 16 increases the temperature of the heat transfer fluid. The warmer heat transfer fluid then flows back to the heat pump 14 via an outlet conduit 20. In addition, to reduce the temperature of the air within the building 12, the heat pump 14 may transfer heat from the air to the heat transfer fluid, thereby cooling the air. Transferring heat from the air to the heat transfer fluid increases the temperature of the heat transfer fluid. The warmer heat transfer fluid flows into the geothermal system 16 via the inlet conduit 18, and the geothermal system 16 reduces the temperature of the heat transfer fluid. The cooler heat transfer fluid then flows back to the heat pump 14 via the outlet conduit 20.

Within the geothermal system 16, heat is transferred between the ground 22 and the heat transfer fluid. In the illustrated embodiment, the geothermal system 16 includes multiple geothermal heat exchangers 24, and each geothermal heat exchanger is disposed within a respective wellbore/borehole within the ground 22. Each geothermal heat exchanger is configured to receive the heat transfer fluid from the inlet conduit 18, to facilitate heat transfer between the heat transfer fluid and the ground 22, and to enable the heat transfer fluid to flow to the outlet conduit 20. For example, while the heat pump 14 is cooling the air within the building 12, each geothermal heat exchanger 24 may facilitate transfer of heat from the warmer heat transfer fluid to the ground 22. In addition, while the heat pump 14 is heating the air within the building 12, each geothermal heat exchanger 24 may facilitate transfer of heat from the ground 22 to the cooler heat transfer fluid. The geothermal system 16 may utilize any suitable type of heat transfer fluid, such as water, propylene glycol, ethylene glycol, or a combination thereof. Furthermore, while the heat pump system 10 includes a single inlet conduit 18 and a single outlet conduit 20 in the illustrated embodiment, in other embodiments, the heat pump system may include additional inlet conduit(s) (e.g., 1, 2, 3, 4, or more additional inlet conduits) and/or additional outlet conduit(s) (e.g., 1, 2, 3, 4, or more additional outlet conduits), in which each inlet/outlet conduit is fluidly coupled to a respective geothermal heat exchanger or a respective group of geothermal heat exchangers. For example, the heat pump system may include an inlet conduit and an outlet conduit for each geothermal heat exchanger of the geothermal system.

Furthermore, each geothermal heat exchanger may have any suitable configuration. For example, in certain embodiments, at least one geothermal heat exchanger may include a single U-tube, in which the heat transfer fluid flows into a first passage of the single U-tube from the heat pump, along a length of the first passage (e.g., which extends along a substantial portion of a length of the respective wellbore), through a U-bend, along a length of a second passage of the single U-tube, and then back to the heat pump. Furthermore, in certain embodiments, at least one geothermal heat exchanger may include multiple U-tubes, in which each U-tube is positioned at any suitable location within the wellbore and oriented at any suitable angle within the wellbore. In such embodiments, the heat transfer fluid may flow through each U-tube along the path disclosed above with regard to the single U-tube. Furthermore, in certain embodiments, at least one geothermal heat exchanger may include one or more co-axial tubes, in which each co-axial tube has an inner flow path and an outer flow path. In such embodiments, the heat transfer fluid may flow into the inner flow path from the heat pump, along a length of the inner flow path (e.g., which extends along a substantial portion of a length of the respective wellbore), through an end portion of the co-axial tube, along a length of the outer flow path, and then back to the heat pump. Alternatively, the heat transfer fluid may flow into the outer flow path from the heat pump, along a length of the outer flow path (e.g., which extends along a substantial portion of a length of the respective wellbore), through an end portion of the co-axial tube, along a length of the inner flow path, and then back to the heat pump. As previously discussed, as the heat transfer fluid flows through each geothermal heat exchanger, heat is transferred between the ground and the heat transfer fluid.

As discussed in detail below, each wellbore may be formed by a drilling machine. The drilling machine may include a drilling string having a drill bit at the distal (e.g., lower) end. The drilling machine may drive the drilling string to rotate while urging the drill bit into the ground 22, thereby forming the wellbore. During the drilling process, drilling fluid (e.g., mud) may be injected into the wellbore. The drilling fluid is configured to cool the drill bit, provide lubrication for the drilling process, and convey cuttings to the surface, among other functions. The drilling machine includes a mast that supports the drilling string. In certain embodiments, the mast may be oriented at various angles relative to a surface 26 of the ground 22, thereby enabling the drilling machine to form wellbores at various angles relative to the ground surface 26. After each wellbore is formed, a geothermal heat exchanger 24 may be disposed within the wellbore, and cement may be injected into the wellbore to secure the geothermal heat exchanger 24 in the target position within the wellbore.

In the illustrated embodiment, the geothermal system 16 includes a wellhead container 28 configured to support at least a portion of the drilling machine and, in certain embodiments, to substantially block flow of fluid (e.g., drilling fluid, water, etc.) from the wellhead container to the ground 22. In certain embodiments, the wellhead container 28 includes a base configured to engage a bottom of a recess within the ground 22. For example, before the wellbores are formed, the recess may be excavated, and the wellhead container 28 may be disposed within the recess. As discussed in detail below, the recess extends vertically from the bottom of the recess to the surface 26 of the ground 22. In addition, the base includes one or more first openings, and each first opening is configured to receive the drilling string. For example, in certain embodiments, the base includes multiple first openings, and each first opening is positioned at a respective target drilling location to enable the drilling string to form a respective wellbore. Accordingly, the first openings within the base function as a template for wellbore drilling locations.

The wellhead container 28 also includes a top configured to support a load (e.g., generally vertical load, etc.) applied by the drilling machine to the wellhead container 28. The top includes a set of second openings, and each second opening is configured to receive the drilling string. In addition, the second openings and the one or more first openings are positioned to enable the drilling string to engage the ground 22 at a respective target angle for each target drilling location. Accordingly, each wellbore may be formed at the target drilling location and oriented at the target angle, thereby enabling the geothermal heat exchangers 24 of the geothermal system 16 to be positioned and oriented to facilitate effective heat transfer between the heat transfer fluid and the ground 22.

Furthermore, the wellhead container 28 includes a sidewall extending along a vertical axis between the base and the top. The sidewall is configured to position an upper surface of the top of the wellhead container 28 substantially flush with the surface 26 of the ground 22, as illustrated. In addition, the sidewall is configured to transfer at least a portion of the load applied by the drilling machine to the base. Accordingly, while the drilling machine is engaged with the top of the wellhead container 28, the load applied by the drilling machine is transferred from the top to the base of the drilling container via the sidewall, and the load is transferred from the base to the bottom of the recess. As a result, the wellhead container 28 supports at least a portion of the load (e.g., weight) of the drilling machine. Furthermore, in certain embodiments, the sidewall is configured to substantially block flow of fluid from the wellhead container to the ground. For example, drilling fluid injected into each wellbore during the wellbore formation process may be collected within the wellhead container and transferred (e.g., continuously transferred via a pump) to a storage container (e.g., tank of a truck), thereby substantially reducing or eliminating collection of drilling fluid within/on the ground. In addition, the second openings and the one or more first openings are positioned to facilitate insertion of the geothermal heat exchangers through the wellhead container 28 to the respective wellbores.

By way of example, the process of forming the geothermal system 16 may include excavating the recess within the ground 22 and disposing the wellhead container 28 within the recess. In certain embodiments, one or more plates may be disposed on the bottom of the recess before the wellhead container 28 is disposed within the recess. Accordingly, the base of the wellhead container may engage the plate(s), thereby distributing the load (e.g., weight) of the wellhead container, the load of the drilling machine, and the load of any fluid/cuttings within the wellhead container over a larger area of the bottom of the recess. Once the wellhead container 28 is disposed within the recess, material (e.g., concrete, cement, rocks, material excavated from the recess, etc.) may be packed around the wellhead container to substantially block movement of the wellhead container relative to the ground 22. The drilling machine may then be engaged with the top of the wellhead container 28, and the drilling string may be moved through an opening within the top and an opening within the base, such that the drill bit engages the ground 22. The drilling machine may then form a first wellbore. The respective geothermal heat exchanger may then be inserted into the wellbore via the opening within the top and the opening within the base of the wellhead container 28, and cement may be injected into the wellbore to secure the geothermal heat exchanger 24 in the target position within the wellbore. The process of forming the wellbore, disposing the geothermal heat exchanger within the wellbore, and injecting cement into the wellbore may be repeated for each geothermal heat exchanger. The wellhead container may enhance the structure of the ground at/near the origins of the wellbores, thereby facilitating the wellbore formation, geothermal heat exchanger insertion, and cementing process. In certain embodiments, the wellhead container may be removed from the recess after the wellbore formation, geothermal heat exchanger insertion, and cementing process. However, in other embodiments, the wellhead container may remain within the recess and house one or more components (e.g., manifold(s), pump(s), line(s), etc.) of the geothermal system/heat pump system.

In the illustrated embodiment, each wellbore/geothermal heat exchanger 24 is angled relative to a line extending perpendicularly to the surface 26 of the ground 22. However, in other embodiments, at least one wellbore/geothermal heat exchanger may be substantially parallel to the line extending perpendicularly to the ground surface 26. Furthermore, in certain embodiments, at least one wellbore/geothermal heat exchanger may extend along a deviated path from the wellhead container 28 into the ground 22. For example, the deviated path may include a first section extending substantially parallel to the line extending perpendicularly to the ground surface 26 and a second section extending at an angle relative to the line extending perpendicularly to the ground surface 26.

Figure 2:
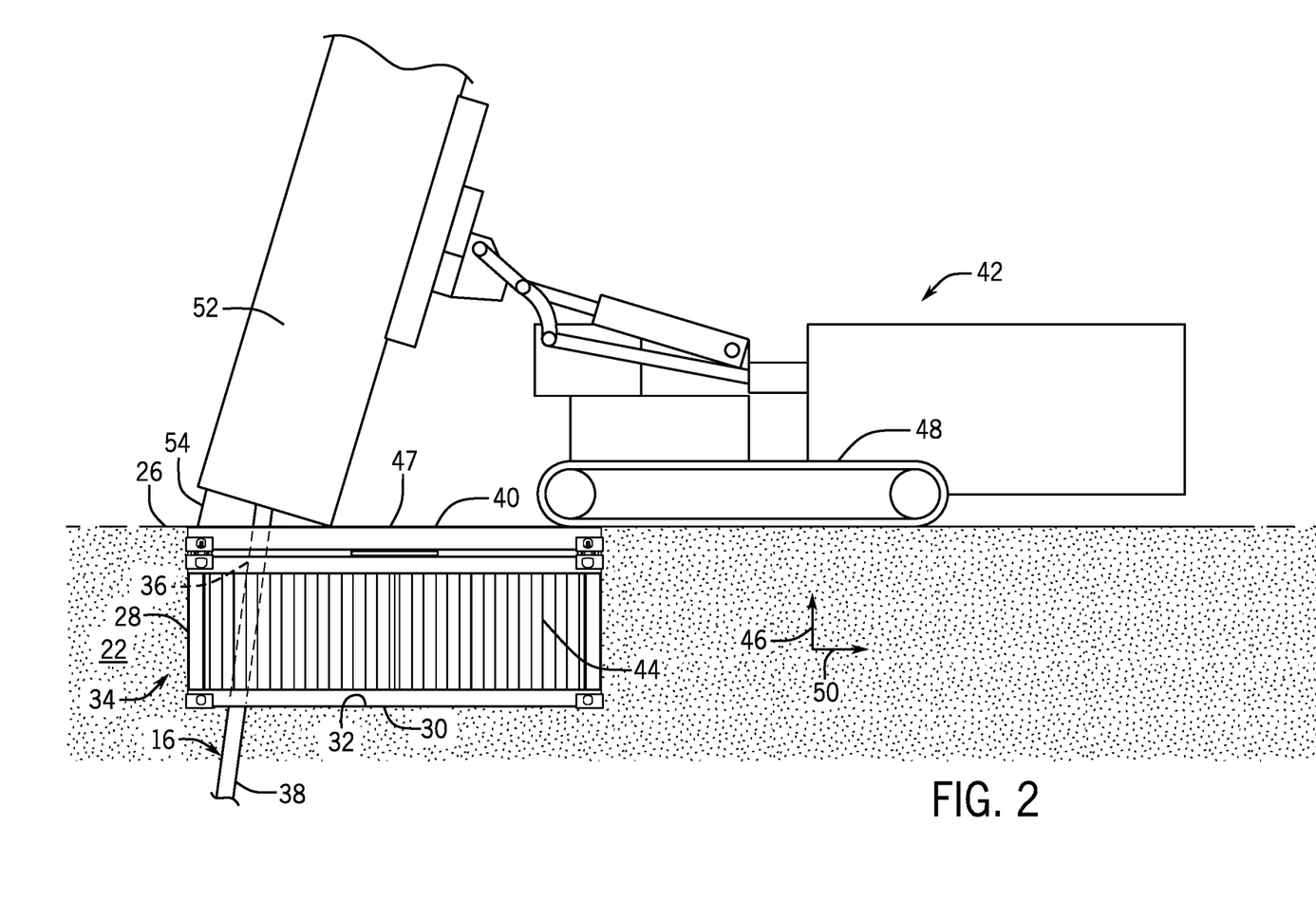
FIG. 2 is a side view of an embodiment of a wellhead container that may be used to form a geothermal system of the heat pump system of FIG. 1.

FIG. 2 is a side view of an embodiment of a wellhead container 28 that may be used to form the geothermal system 16 of the heat pump system of FIG. 1. In the illustrated embodiment, the wellhead container 28 includes a base 30 engaged with a bottom 32 of a recess 34. As illustrated, the recess 34 extends vertically from the bottom 32 of the recess 34 to the surface 26 of the ground 22. As discussed in detail below, the base 30 includes one or more first openings, and each first opening is configured to receive the drilling string 36. In embodiments in which the base 30 includes multiple first openings, each first opening may be positioned at a respective target drilling location to enable the drilling string 36 to form a respective wellbore 38. Accordingly, the openings within the base 30 may function as a template for wellbore drilling locations.

The wellhead container 28 also includes a top 40 configured to support a load (e.g., generally vertical load, etc.) applied by a drilling machine 42 to the wellhead container 28. The top 40 includes a set of second openings, and each second opening is configured to receive the drilling string 36. In addition, the second openings and the one or more first openings are positioned to enable the drilling string 36 to engage the ground 22 at a respective target angle for each target drilling location. Accordingly, each wellbore 38 may be formed at the target drilling location and oriented at the target angle, thereby enabling the geothermal heat exchangers of the geothermal system 16 to be positioned and oriented to facilitate effective heat transfer between the heat transfer fluid and the ground 22.

In certain embodiments (e.g., embodiments in which the base includes multiple first openings), each first opening (e.g., opening within the base) is associated with a corresponding second opening (e.g., opening within the top). Aligning the drilling string with a line that passes through the associated openings may substantially orient the drilling string at the target angle. For example, each first opening may be identified by a designation (e.g., number, letter, etc.), and the associated second opening may be identified by a corresponding designation (e.g., the same number, the same letter, etc.). For each first opening, an operator or an automated system may determine the associated second opening based on the designations. The operator or the automated system may then align the drilling string with a line that passes through the associated openings, thereby forming a respective wellbore having the target orientation (e.g., substantially the target orientation) at the target drilling location (e.g., location of the respective first opening). Accordingly, the wellhead container may function as a multi-dimensional template for the wellbores. The designations of the openings may be written on the wellhead container, written on an operator-viewable document, stored within a memory of the automated system, or a combination thereof.

Furthermore, as discussed in detail below, the wellhead container 28 includes a sidewall 44 extending along a vertical axis 46 between the base 30 and the top 40. The sidewall 44 is configured to position an upper surface 47 of the top 40 of the wellhead container 28 substantially flush with the surface 26 of the ground 22, as illustrated. As used herein with regard to alignment of the upper surface 47 of the wellhead container top 40 with respect to the ground surface 26, "substantially flush" refers to a vertical variation between the upper surface of the wellhead container top and the ground surface of less than a threshold value (e.g., distance, percentage of the vertical extent of the wellhead container, etc.). For example, the threshold value may be 25 percent, 20 percent, 15 percent, 10 percent, 7 percent, 5 percent, 2 percent, 1 percent, 0.5 percent, or 0.1 percent of the vertical extent of the wellhead container (e.g., extent of the wellhead container along the vertical axis 46 of the wellhead container).

In addition, the sidewall 44 is configured to transfer at least a portion of the load applied by the drilling machine 42 to the base 30. Accordingly, while the drilling machine 42 is engaged with the top 40 of the wellhead container 28, the load applied by the drilling machine 42 is transferred from the top 40 to the base 30 of the drilling container 28 via the sidewall 44, and the load is transferred from the base 30 to the bottom 32 of the recess 34. As a result, the wellhead container 28 supports at least a portion of the load (e.g., weight) of the drilling machine 42.

While the drilling machine 42 is positioned to form the illustrated wellbore 38, a portion of tracks 48 of the drilling machine 42 overlaps the wellhead container 28 along a longitudinal axis 50 of the wellhead container 28. Accordingly, a portion of the load applied by the drilling machine 42 to the wellhead container is applied by the tracks 48. However, while the drilling machine 42 is positioned to form other wellbores, the tracks 48 may not overlap a portion of the wellhead container. While the drilling machine includes tracks in the illustrated embodiment, in other embodiments, the drilling machine may include wheels. In such embodiments, one or more wheels may engage the wellhead container and apply a load to the wellhead container. In addition, in the illustrated embodiment, the drilling machine 42 includes a mast 52 configured to support the drilling string 36 and to orient the drilling string 36 at the target angle for each target drilling location/wellbore. At least while the mast 52 is oriented at an angle relative to the vertical axis 46 of the wellhead container 28, a shim 54 may be disposed between a bottom of the mast 52 and the top 40 of the wellhead container 28. The shim 54 is configured to distribute the vertical load of the mast 42 over a larger area of the top 40 of the wellhead container 28. At least a portion of the load applied by the drilling machine 42 to the wellhead container 28 is applied by the mast 52. As previously discussed, the sidewall 44 is configured to transfer at least a portion of the load applied by the drilling machine 42 to the base 30. Accordingly, while the drilling machine 42 is engaged with the top 40 of the wellhead container 28, the load applied by the drilling machine 42 is transferred from the top 40 to the base 30 of the drilling container 28 via the sidewall 44, and the load is transferred from the base 30 to the bottom 32 of the recess 34. While a portion of the load (e.g., weight) of the drilling machine is applied to the wellhead container 28 in the illustrated embodiment, in other embodiments, an entirety of the load (e.g., weight) of the drilling machine may be applied to the wellbore container. The structure of the wellbore container (e.g., the base, the top, and the sidewall) may be particularly configured to support the maximum expected load from the drilling machine.

Furthermore, in certain embodiments, the sidewall 44 is configured to substantially block flow of fluid from the wellhead container 28 to the ground 22. For example, during the drilling process, drilling fluid (e.g., mud) may be injected into the wellbore 38. The drilling fluid may be collected within the wellhead container and transferred (e.g., continuously transferred via a pump) to a storage container (e.g., tank of a truck), thereby substantially reducing or eliminating collection of drilling fluid within/on the ground. In addition, the second openings and the one or more first openings are positioned to facilitate insertion of the geothermal heat exchangers through the wellhead container 28 to the respective wellbores.

By way of example, to form the geothermal system 16, the drilling machine 42 may be engaged with the top 40 of the wellhead container 28, and the drilling string 36 may be moved through an opening within the top 40 and an opening within the base 30, such that a drill bit of the drilling string 36 engages the ground 22. The drilling machine 42 may then form a first wellbore 38. The respective geothermal heat exchanger may then be inserted into the wellbore 38 via the opening within the top 40 and the opening within the base 30 of the wellhead container 28, and cement may be injected into the wellbore 38 to secure the geothermal heat exchanger in the target position within the wellbore. The drilling machine 42 may then adjust the angle and position of the mast 52 for the next wellbore, and the process of forming the wellbore, disposing the geothermal heat exchanger within the wellbore, and injecting cement into the wellbore may be repeated for each geothermal heat exchanger. Additionally or alternatively, in certain embodiments, the drilling machine may form at least a portion of the wellbores (e.g., all of the wellbores) before the first geothermal heat exchanger is disposed within the respective wellbore.

The wellhead container may enhance the structure of the ground at/near the origins of the wellbores, thereby facilitating the wellbore formation, geothermal heat exchanger insertion, and cementing process. Furthermore, in certain embodiments, structural cement/concrete may be injected into each wellbore proximate to the origin (e.g., above the geothermal heat exchanger) to further enhance the structure of the ground. In certain embodiments (e.g., in embodiments in which each geothermal heat exchanger is fluidly coupled to the heat pump via respective inlet/outlet conduits), the wellhead container may be removed from the recess after the wellbore formation, geothermal heat exchanger insertion, and cementing process. However, in other embodiments (e.g., in embodiments in which multiple heat exchangers are fluidly coupled to a single inlet conduit and a single outlet conduit), the wellhead container may remain within the recess and house one or more components (e.g., manifold(s), pump(s), line(s), etc.) of the geothermal system/heat pump system.

Figure 3:
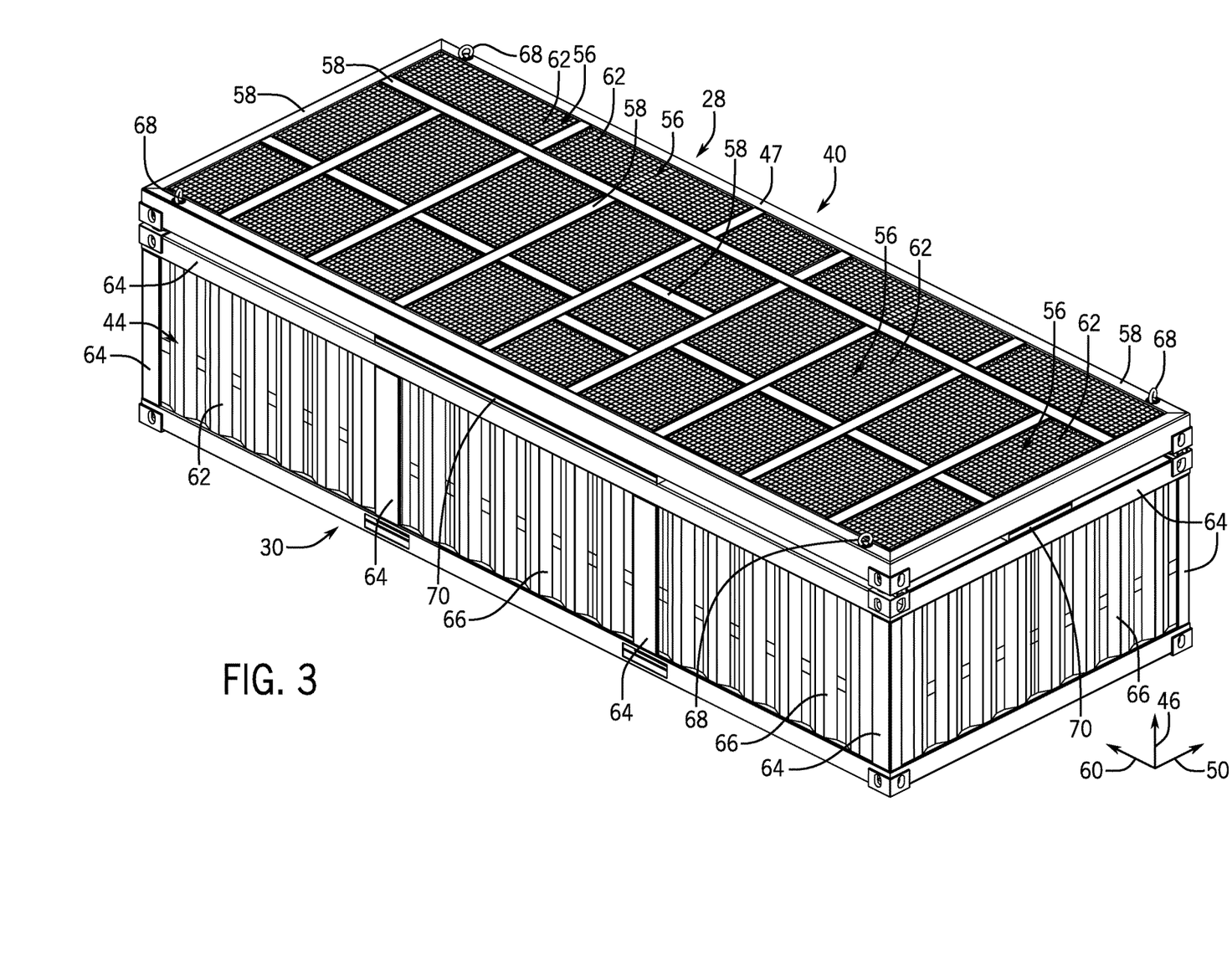
FIG. 3 is a perspective view of the wellhead container of FIG. 2.

FIG. 3 is a perspective view of the wellhead container 28 of FIG. 2. As previously discussed, the base 30 of the wellhead container 28 is configured to engage the bottom of the recess within the ground. In addition, the base 30 includes one or more first openings, and each first opening is configured to receive the drilling string. In certain embodiments, the base includes multiple first openings, and each first opening is positioned at a respective target drilling location. Furthermore, the top 40 is configured to support a load applied by a drilling machine to the wellhead container 28. As discussed in detail below, the top 40 includes a set of second openings 56, and each second opening 56 is configured to receive the drilling string. In addition, the sidewall 44 extends along the vertical axis 46 between (e.g., at least partially between) the base 30 and the top 40. The sidewall 44 is configured to position the upper surface 47 of the top 40 substantially flush with the surface of the ground, and the sidewall 44 is configured to transfer at least a portion of the load to the base 30. Furthermore, in certain embodiments, the sidewall 44 is configured to substantially block flow of fluid from the wellhead container 28 to the ground.

In the illustrated embodiment, the top 40 is formed from multiple linear structural members 58 coupled to one another, and the second openings 56 are formed between the linear structural members 58. The linear structural members 58 may be coupled to one another by any suitable type(s) of connection(s), such as welded connection(s), fastener connection(s), pinned connection(s), adhesively bonded connection(s), other suitable type(s) of connection(s), or a combination thereof. Furthermore, the linear structural member(s) may include tube(s) (e.g., square tube(s), round tube(s), polygonal tube(s), etc.), rod(s) (e.g., square rod(s), round rod(s), polygonal rod(s), etc.), other suitable type(s) of linear structural member(s), or a combination thereof. The linear structural members 58 may be arranged in any suitable configuration. In the illustrated embodiment, each linear structural member 58 extends along the longitudinal axis 50 or a lateral axis 60 of the wellhead container 28. However, in other embodiments, at least one linear structural member may be arranged at an angle relative to the longitudinal axis 50 and the lateral axis 60.

In the illustrated embodiment, each second opening 56 within the top 40 of the wellhead container 28 is substantially rectangular (e.g., square). However, in other embodiments, at least one second opening may have another suitable shape (e.g., triangular, hexagonal, etc.). Furthermore, while each structural member is linear in the illustrated embodiment, in other embodiments, at least one structural member may have another suitable shape (e.g., polygonal, curved, circular, elliptical, etc.). In such embodiments, the second opening(s) formed by the structural member(s) may have corresponding shape(s). In addition, while the top of the wellhead container is formed from structural members in the illustrated embodiment, in other embodiments, at least a portion of the top may be formed by other suitable element(s) (e.g., alone or in combination with the structural member(s)), such as plate(s), rib(s), other suitable element(s), or a combination thereof. In such embodiments, the second opening(s) may be formed by the respective element(s). Furthermore, while the top 40 includes multiple second openings 56 in the illustrated embodiment, in other embodiments, the top may include a single opening configured to receive the drilling string.

In the illustrated embodiment, each second opening 56 is configured to be covered by a respective grate 62. The grates 62 are configured to substantially block objects from entering the wellhead container 28. During the wellbore formation, geothermal heat exchanger insertion, and cementing process, a grate 62 may be removed to facilitate passage of the drilling string and the geothermal heat exchanger through the respective second opening 56. After the wellbore formation, geothermal heat exchanger insertion, and cementing process is complete for the respective drilling location, the respective grate 62 may be replaced. In the illustrated embodiment, the grates 62 are recessed relative to upper surfaces of the structural members. Accordingly, the upper surfaces of the structural members form the upper surface 47 of the top 40. As a result, at least a portion of the load from the drilling machine is applied to the structural members. However, in other embodiments, at least one grate may be substantially flush with the upper surface of at least one structural member (e.g., such that the upper surface of the grate forms a portion of the upper surface of the top, and a portion of the load from the drilling machine may be applied to the at least one grate). Additionally or alternatively, an upper surface of at least one grate may be positioned above the upper surface of at least one structural member (e.g., such that the upper surface of the grate forms at least a portion of the upper surface of the top, and a portion of the load from the drilling machine may be applied to the at least one grate). While each second opening 56 is selectively covered by a single grate in the illustrated embodiment, in other embodiments, at least one second opening may be selectively covered by other suitable structure(s) (e.g., alone or in combination with the single grate), such as multiple grates, one or more plate(s), other suitable structure(s), or a combination thereof. Furthermore, in certain embodiments, at least one second opening may not be selectively covered during formation and/or operation of the geothermal system.

In the illustrated embodiment, the sidewall 44 extends about an entire periphery of the wellhead container 28 (e.g., at least during the wellbore formation, geothermal heat exchanger insertion, and cementing process). Furthermore, in the illustrated embodiment, the sidewall 44 is configured to substantially block flow of fluid from the wellhead container to the ground. However, in other embodiments, the sidewall may only extend about a portion of the periphery of the wellhead container, and/or the sidewall may include one or more apertures. In such embodiments, the sidewall may enable fluid from the wellhead container to flow to the ground. In the illustrated embodiment, the sidewall 44 includes multiple linear structural members 64. The linear structural members may include tube(s) (e.g., square tube(s), round tube(s), polygonal tube(s), etc.), rod(s) (e.g., square rod(s), round rod(s), polygonal rod(s), etc.), other suitable type(s) of linear structural member(s), or a combination thereof. In addition, the sidewall 44 includes multiple panels 66 coupled to the linear structural members 64. The sidewall 44 may include any suitable number of linear structural members 64 (e.g., 1, 2, 3, 4, 5, 6, 7, 8, 9, 10, 11, 12, 13, 14, 15, 16, or more). Furthermore, the sidewall 44 may include any suitable number of panels 66 (e.g., 1, 2, 3, 4, 5, 6, 7, 8, 9, 10, 11, 12, 13, 14, 15, 16, or more). While the sidewall 44 is formed from the linear structural members 64 and the panels 66 in the illustrated embodiment, in other embodiments, the sidewall may be formed by other and/or additional component(s) (e.g., alone or in combination with linear structural member(s) and/or panel(s)), such as structural plate(s), angled/bent structural member(s), curved structural member(s), other suitable component(s), or a combination thereof.

In the illustrated embodiment, the sidewall 44 is configured to transfer an entirety of the load from the drilling machine (e.g., the load applied by the drilling machine to the wellhead container 28) to the base 30. However, in other embodiments, the wellhead container may include one or more additional elements (e.g., within an interior of the wellhead container) configured to transfer a portion of the load from the drilling machine to the base. In the illustrated embodiment, the top 40 is configured to be removed from the sidewall 44 (e.g., after the wellbore formation, geothermal heat exchanger insertion, and cementing process). Accordingly, the top 40 includes lifting attachments 68 configured to facilitate removal of the top 40 from the sidewall 44. While the top includes four lifting attachments 68 in the illustrated embodiment, in other embodiments, the top may include more or fewer lifting attachments (e.g., 0, 1, 2, 3, 5, 6, or more).

Furthermore, in the illustrated embodiment, the wellhead container 28 includes pads 70 positioned between the sidewall 44 and the top 40. The pads 70 are configured to support the top 40 on the sidewall 44 and to facilitate transfer of the load from the drilling machine to the sidewall 44. In the illustrated embodiment, each pad is positioned between a linear structural member 58 of the top 40 and a respective linear structural member 64 of the sidewall 44. However, in other embodiments, at least one pad may be positioned in another suitable location between the top and the sidewall. Furthermore, in certain embodiments, the pads may be omitted. In addition, in certain embodiments, the top may be non-removably coupled to the sidewall (e.g., by welded connection(s), adhesive connection(s), riveted connection(s), etc.). While the wellhead container 28 has a rectangular shape within a plane formed by the longitudinal axis 50 and the lateral axis 60 in the illustrated embodiment, in other embodiments, the wellhead container may have another suitable shape within the longitudinal/lateral axis plane (e.g., circular, elliptical, polygonal, etc.).

Figure 4:
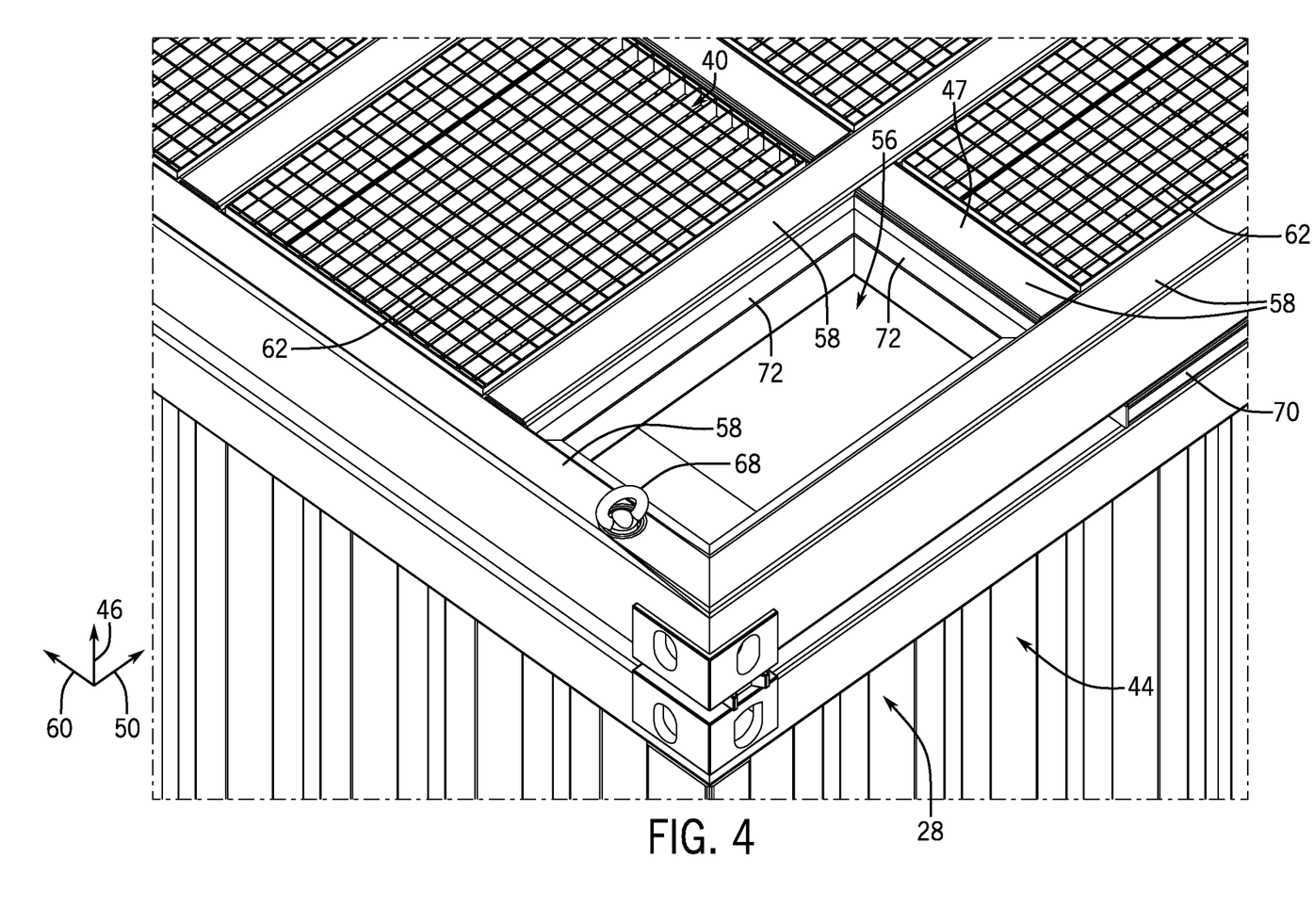
FIG. 4 is a perspective view of a portion of the wellhead container of FIG. 2, in which a grate is removed.

FIG. 4 is a perspective view of a portion of the wellhead container 28 of FIG. 2, in which a grate 62 is removed. As previously discussed, each grate 62 is configured to be selectively removed from the top 40 to facilitate passage of the drilling string and the geothermal heat exchanger through the respective second opening 56. In the illustrated embodiment, while each grate 62 covers the respective second opening 56, the grate 62 is supported by lips 72 coupled to the linear structural members 58 of the top 40. The lips may be coupled to the linear structural members by any suitable type(s) of connection(s), such as welded connection(s), fastener connection(s), adhesive connection(s), other suitable type(s) of connection(s), or a combination thereof. In addition, while the lips are coupled to the linear structural members in the illustrated embodiment, in embodiments in which the top is formed by other suitable element(s), the lips may be coupled to the other suitable element(s). Furthermore, while each grate is supported by lips in the illustrated embodiment, in other embodiments, at least one grate may be supported by other suitable structure(s) (e.g., alone or in combination with lip(s)), such as pin(s), latch(es), other suitable type(s) of structure(s), or a combination thereof.

Figure 5:
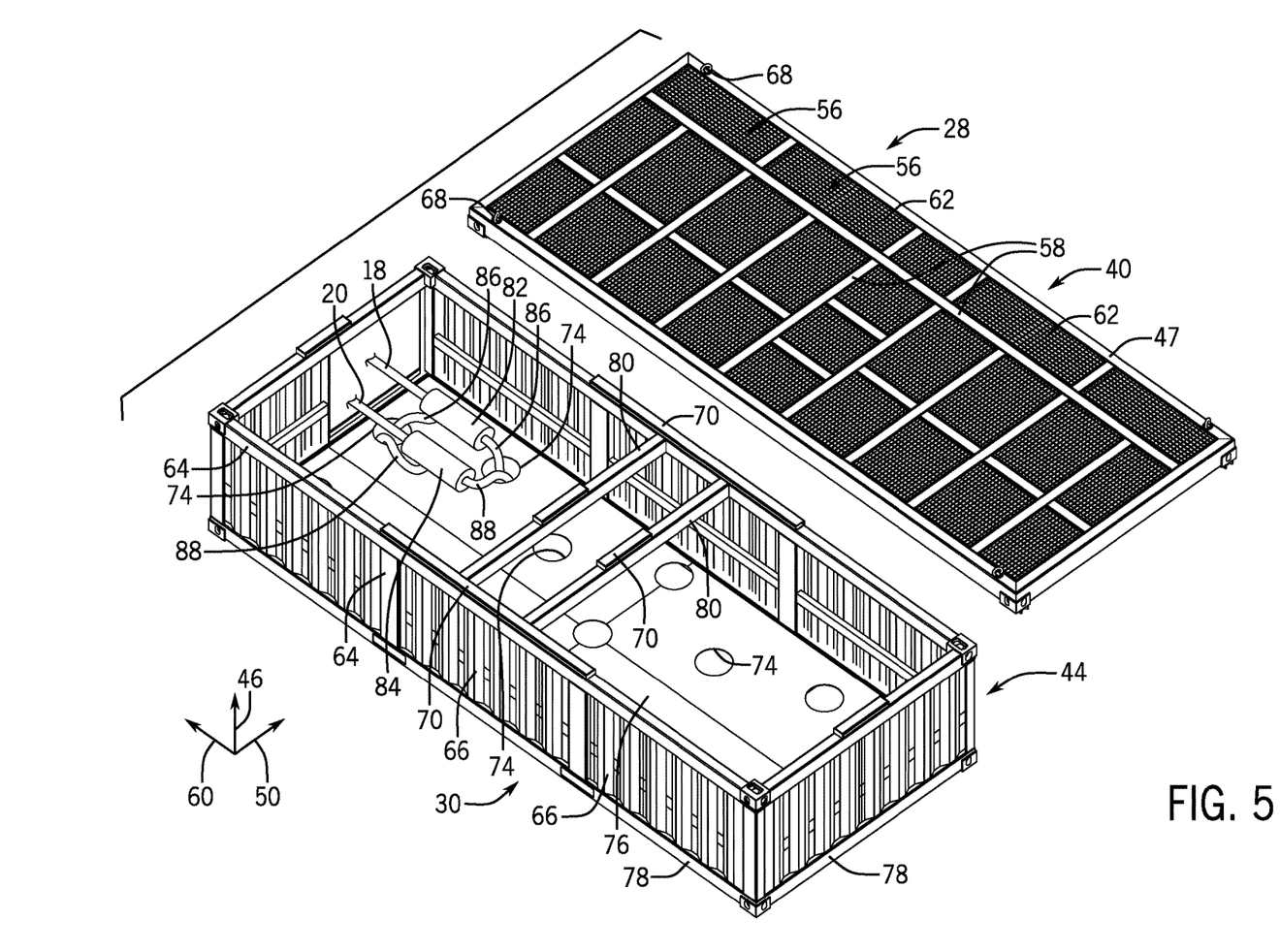
FIG. 5 is a perspective view of the wellhead container of FIG. 2, in which a top of the wellhead container is removed.

FIG. 5 is a perspective view of the wellhead container 28 of FIG. 2, in which the top 40 of the wellhead container 28 is removed. In the illustrated embodiment, the base 30 of the wellhead container 28 includes a set of first openings 74, and each first opening 74 is configured to receive the drilling string and the respective geothermal heat exchanger. In addition, each first opening 74 is positioned at a respective target drilling location to enable the drilling string to form the respective wellbore. Accordingly, the first openings 74 within the base 30 function as a template for wellbore drilling locations. While the base 30 includes multiple first openings 74 in the illustrated embodiment, in other embodiments, the base may include a single opening. In such embodiments, the single opening may be sufficiently large to enable the drilling string to form each wellbore at the respective target drilling location.

In the illustrated embodiment, the base 30 is formed from a plate 76 and linear structural members 78, and the first openings 74 are formed within the plate 76. The linear structural members 78 may include tube(s) (e.g., square tube(s), round tube(s), polygonal tube(s), etc.), rod(s) (e.g., square rod(s), round rod(s), polygonal rod(s), etc.), other suitable type(s) of linear structural member(s), or a combination thereof. In addition, the linear structural members 78 may be arranged in any suitable configuration (e.g., at least some of the linear structural members may be positioned beneath the plate to support the plate). Furthermore, while each structural member is linear in the illustrated embodiment, in other embodiments, at least one structural member may have another suitable shape (e.g., polygonal, curved, circular, elliptical, etc.). While the base of the wellhead container is formed from structural members and a plate in the illustrated embodiment, in other embodiments, at least a portion of the base may be formed by other suitable element (s) (e.g., alone or in combination with structural member(s) and plate(s)), such one or more rib(s), other suitable element (s), or a combination thereof.

In the illustrated embodiment, the wellhead container 28 includes two additional supports 80 extending between opposite longitudinal ends of the sidewall 66. The additional supports 80 are configured to support a central portion of the top 40. In addition, a pad 70 is coupled to each additional support 80 and configured to engage the top 40 (e.g., a linear structural member 58 of the top 40). However, in other embodiments, at least one pad may be omitted. Furthermore, while the wellhead container includes two additional supports in the illustrated embodiment, in other embodiments, the wellhead container may include more or fewer additional supports (e.g., 0, 1, 3, 4, 5, 6, 7, 8, or more). In addition, each additional support may be coupled to any suitable element/member of the wellhead container.

In certain embodiments, each first opening 74 within the base 30 is associated with a second corresponding opening 56 within the top 40. Aligning the drilling string with a line that passes through the associated openings may substantially orient the drilling string at the target angle. For example, each first opening 74 within the base 30 may be identified by a designation (e.g., number, letter, etc.), and the associated second opening 56 within the top 40 may be identified by a corresponding designation (e.g., the same number, the same letter, etc.). For each base opening 74, an operator or an automated system may determine the associated top opening 56 based on the designations. The operator or the automated system may then align the drilling string with a line that passes through the associated openings, thereby forming a respective wellbore having the target orientation (e.g., substantially the target orientation) at the target drilling location. Accordingly, the wellhead container 28 may function as a multi-dimensional template for the wellbores. The designations of the openings may be written on the wellhead container, written on an operator-viewable document, stored within a memory of the automated system, or a combination thereof.

In certain embodiments, the wellhead container may be removed from the recess after the wellbore formation, geothermal heat exchanger insertion, and cementing process. However, in other embodiments, the wellhead container may remain within the recess and house one or more components (e.g., manifold(s), pump(s), line(s), etc.) of the geothermal system/heat pump system. For example, in the illustrated embodiment, the geothermal system includes an input manifold 82 and an output manifold 84. The input manifold 82 is configured to receive heat transfer fluid from an inlet (e.g., inlet conduit 18) and to direct the heat transfer fluid to the geothermal heat exchangers via inlet lines 86. Furthermore, the output manifold 84 is configured to receive the heat transfer fluid from the geothermal heat exchangers via outlet lines 88 and to direct the heat transfer fluid to an outlet (e.g., outlet conduit 20). As illustrated, the input manifold 82 and the output manifold 84 are disposed within the wellhead container 28. However, in other embodiments, the inlet manifold and/or the outlet manifold may be disposed in another suitable location (e.g., in embodiments in which the wellhead container is removed from the recess after the wellbore formation, geothermal heat exchanger insertion, and cementing process).

Furthermore, while the input manifold and the output manifold are fluidly coupled to two geothermal heat exchangers in the illustrated embodiment, in other embodiments, each manifold may be fluidly coupled to more than two geothermal heat exchangers. In addition, in certain embodiments, the geothermal system may include multiple input manifolds and multiple output manifolds, in which each input/output manifold is fluidly coupled to a respective group of geothermal heat exchangers.

In the illustrated embodiment, a panel 66 or a portion of a panel 66 of the sidewall 44 is removed from the wellhead container 28 to facilitate passage of the inlet conduit 18 and the outlet conduit 20 through the wellhead container. For example, during the wellbore formation, geothermal heat exchanger insertion, and cementing process, the panel/portion of the panel may be present within the sidewall to enable the sidewall to substantially block flow of fluid from the wellhead container to the ground. In addition, once the wellbore formation, geothermal heat exchanger insertion, and cementing process is complete, the panel/portion of the panel may be removed to facilitate passage of the inlet and outlet conduits. While a removable panel is used to selectively facilitate passage of the conduits in the illustrated embodiment, in other embodiments, other suitable removable/movable element(s) may be used to selectively facilitate passage of the conduits (e.g., door(s), window(s), port (s), etc.). Furthermore, in certain embodiments, the sidewall may include an aperture that facilitates passage of the conduits and remains open during the wellbore formation, geothermal heat exchanger insertion, and cementing process. In such embodiments, the sidewall may enable fluid from the wellhead container to flow to the ground.

Figure 6:
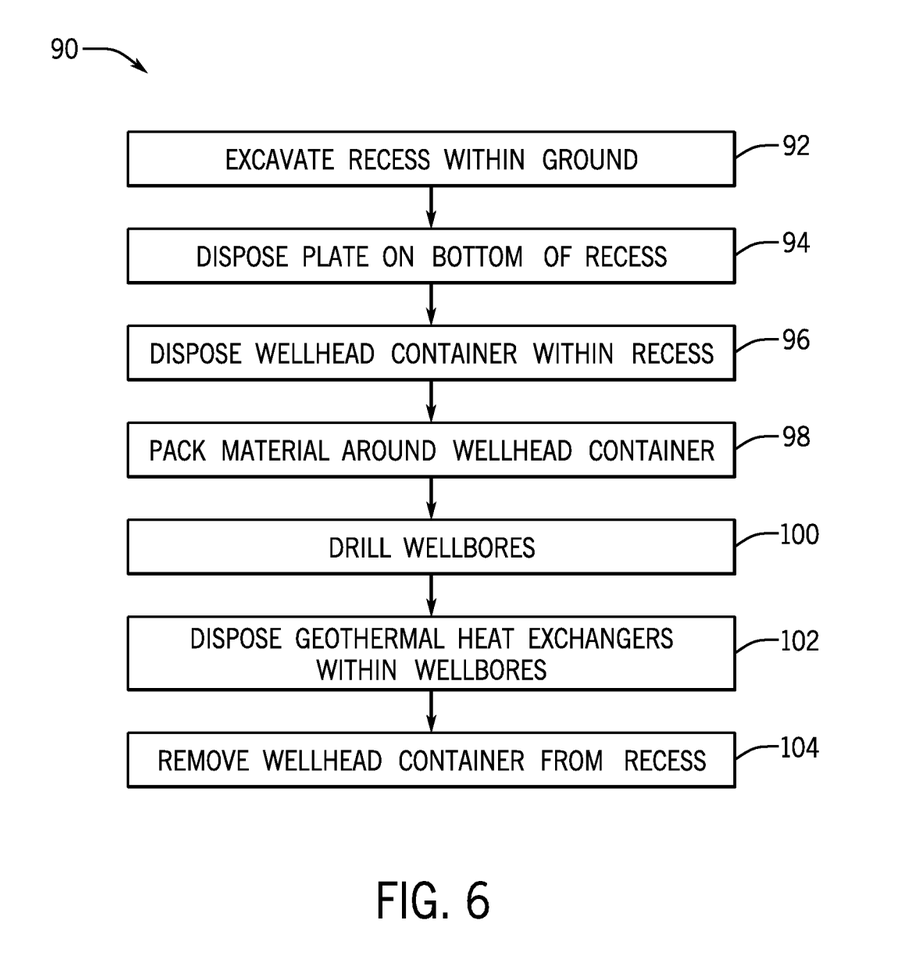
FIG. 6 is a flow diagram of an embodiment of a method of forming a geothermal system.

FIG. 6 is a flow diagram of an embodiment of a method 90 of forming a geothermal system. First, as represented by block 92, a recess is excavated within the ground. As previously discussed, the recess extends vertically from the bottom of the recess to the surface of the ground. Next, in certain embodiments, one or more plates may be disposed on the bottom of the recess, such that the base of the wellhead container engages the plate(s), as represented by block 94. As previously discussed, the plates may distribute the load (e.g., weight) of the wellhead container, the load of the drilling machine, and the load of any fluid/cuttings within the wellhead container over a larger area of the bottom of the recess. However, in other embodiments, the step of disposing the plate(s) on the bottom of the recess may be omitted.

As represented by block 96, the wellhead container is disposed within the recess. As previously discussed, the wellhead container includes the base, the top, and the sidewall extending along the vertical axis between the base and the top. In addition, the base engages the bottom of the recess while the wellhead container is disposed within the recess. As used herein with regard to engagement of the base of the wellhead container with the bottom of the recess, "engage"/"configured to engage" includes engagement via one or more plates positioned between the base of the wellhead container and the bottom of the recess. Furthermore, as previously discussed, the base includes one or more first openings, in which each first opening is configured to receive the drilling string. In certain embodiments, the base may include multiple first openings, and each opening is positioned at a respective target drilling location. In addition, the top is configured to support the load applied by the drilling machine to the wellhead container. The top includes the set of second openings, and each second opening is configured to receive the drilling string. Furthermore, the sidewall positions the upper surface of the top substantially flush with the surface of the ground while the wellhead container is disposed within the recess. The sidewall is configured to transfer at least a portion of the load (e.g., an entirety of the load) to the base. In certain embodiments, the sidewall is configured to substantially block flow of fluid from the wellhead to the ground.

In certain embodiments, after the wellhead container is disposed within the recess, material is packed around the wellhead container to substantially block movement of the wellhead container relative to the ground, as represented by block 98. Next, as represented by block 100, the wellbores are then drilled/formed (e.g., by the drilling machine). The geothermal heat exchangers are then inserted/disposed into the wellbores, as represented by block 102. In addition, cement may be injected into the wellbores to secure the geothermal heat exchangers in the target positions within the wellbores. While the method includes drilling/forming the wellbores and then inserting/disposing the geothermal heat exchangers into the wellbores in the illustrated embodiment, in other embodiments, each geothermal heat exchanger may be inserted/disposed within the respective wellbore (e.g., and cemented) before the next wellbore is drilled/formed. In certain embodiments, the wellhead container is removed from the recess after the geothermal heat exchangers are disposed within the wellbores (e.g., and cemented), as represented by block 104. However, in other embodiments, the wellhead container may remain within the recess and house one or more components (e.g., manifold(s), pump(s), line(s), etc.) of the geothermal system/heat pump system.

In certain embodiments, the temperature within at least one wellbore may be monitored. In such embodiments, the geothermal system may include a Distributed Temperature Sensing (DTS) system having optical fibers extending along the length of the wellbore. The DTS system is configured to generate a continuous temperature profile along the length of the wellbore based on feedback from the optical fibers. In certain embodiments, the heat pump system may control the temperature of the heat transfer fluid output to the geothermal heat exchangers (e.g., collectively or on an individual basis) based on the measured temperature(s) within the wellbore(s) (e.g., measured by the DTS system(s) or other suitable temperature monitoring system(s)). For example, the heat pump system may automatically maintain the temperature of the heat transfer fluid that is output to the geothermal heat exchangers above a threshold temperature to substantially reduce or eliminate the possibility of freezing the ground at/near the wellbore origins.

While the sidewall is configured to position the upper surface of the top substantially flush with the surface of the ground and to transfer at least a portion of the drilling machine load to the base in the embodiments disclosed above, in certain embodiments, the top may be supported by another suitable element. For example, in certain embodiments, the top may be supported by one or more structural elements extending from the base (e.g., within the wellhead container and separate from the sidewall). Accordingly, the structural element(s) may position the upper surface of the top substantially flush with the surface of the ground and may transfer at least a portion of the drilling machine load to the base. Furthermore, in certain embodiments, the top may be supported by the ground above the sidewall. In such embodiments, the ground (e.g., a second recess within the ground that is positioned around the first recess containing the base and the sidewall, and is shallower than the recess) may position the upper surface of the top substantially flush with the surface of the ground and may support the top. In any of the embodiments disclosed herein, the sidewall may substantially block flow of fluid from the wellhead container to the ground.

Technical effects of the disclosure include enhancing the structure of the ground at/near the origins of the wellbores and, in certain embodiments, substantially reducing or eliminating collection of drilling fluid within/on the ground. The wellhead container may enhance the structure of the ground at/near the origins of the wellbores, thereby facilitating the wellbore formation, geothermal heat exchanger insertion, and cementing process. Furthermore, in certain embodiments, the sidewall of the wellhead container is configured to substantially block flow of fluid from the wellhead container to the ground. For example, the drilling fluid injected into each wellbore during the wellbore formation process may be collected within the wellhead container and transferred (e.g., continuously transferred via a pump) to a storage container (e.g., tank of a truck), thereby substantially reducing or eliminating collection of drilling fluid within/on the ground.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A wellhead container for a geothermal system, comprising:
   a base configured to engage a bottom of a recess within a ground, wherein the recess extends vertically from the bottom of the recess to a surface of the ground, the base comprises at least one first opening, and the at least one first opening is configured to receive a drilling string;
   a top configured to support a load applied by a drilling machine to the wellhead container, wherein the top comprises a plurality of second openings, and each second opening of the plurality of second openings is configured to receive the drilling string; and
   a sidewall extending along a vertical axis between the base and the top, wherein the sidewall is configured to substantially block flow of fluid from the wellhead container to the ground,
   wherein the bottom comprises at least one linear structural member and at least one panel coupled to the at least one linear structural member, wherein the at least one first opening is formed in the at least one panel.

2. The wellhead container of claim 1, wherein the at least one first opening comprises a plurality of first openings, and each first opening of the plurality of first openings is positioned at a respective target drilling location of a plurality of target drilling locations.

3. The wellhead container of claim 2, wherein the plurality of first openings and the plurality of second openings are positioned to enable the drilling string to engage the ground at a respective target angle for each target drilling location of the plurality of target drilling locations.

4. The wellhead container of claim 1, comprising a plurality of grates, and each grate of the plurality of grates is configured to selectively cover a respective second opening of the plurality of second openings.

5. The wellhead container of claim 1, wherein the top is formed from a plurality of linear structural members coupled to one another, and the plurality of second openings is formed between the plurality of linear structural members.

6. A method of forming a geothermal system, comprising:
excavating a recess within a ground, wherein the recess extends vertically from a bottom of the recess to a surface of the ground; and
disposing a wellhead container within the recess, wherein the wellhead container comprises a base, a top, and a sidewall extending along a vertical axis between the base and the top, the base engages the bottom of the recess while the wellhead container is disposed within the recess, the base comprises at least one first opening, the at least one first opening is configured to receive a drilling string, the top is configured to support a load applied by a drilling machine to the wellhead container, the top comprises a plurality of second openings, each second opening of the plurality of second openings is configured to receive the drilling string, the sidewall positions an upper surface of the top substantially flush with the surface of the ground while the wellhead container is disposed within the recess, and the sidewall is configured to transfer at least a portion of the load to the base
comprising disposing a plate on the bottom of the recess before disposing the wellhead container within the recess, such that the base of the wellhead container engages the plate.

7. The method of claim 6, wherein the sidewall is configured to substantially block flow of fluid from the wellhead container to the ground.

8. The method of claim 6, comprising packing material around the wellhead container after the wellhead container is disposed within the recess.

9. The method of claim 6, comprising drilling a plurality of wellbores at a plurality of target drilling locations after the wellhead container is disposed within the recess.

10. The method of claim 9, comprising disposing a plurality of geothermal heat exchangers within the plurality of wellbores.

11. The method of claim 10, comprising removing the wellhead container from the recess after disposing the plurality of geothermal heat exchangers within the plurality of wellbores.

12. A method of forming a geothermal system, comprising:
excavating a recess within a ground, wherein the recess extends vertically from a bottom of the recess to a surface of the ground; and
disposing a wellhead container within the recess, wherein the wellhead container comprises a base, a top, and a sidewall extending along a vertical axis between the base and the top, the base engages the bottom of the recess while the wellhead container is disposed within the recess, the base comprises at least one first opening, the at least one first opening is configured to receive a drilling string, the top is configured to support a load applied by a drilling machine to the wellhead container, the top comprises a plurality of second openings, each second opening of the plurality of second openings is configured to receive the drilling string, the sidewall positions an upper surface of the top substantially flush with the surface of the ground while the wellhead container is disposed within the recess, and the sidewall is configured to transfer at least a portion of the load to the base,
further comprising:
drilling a plurality of wellbores at a plurality of target drilling locations after the wellhead container is disposed within the recess,
disposing a plurality of geothermal heat exchangers within the plurality of wellbores
comprising removing the wellhead container from the recess after disposing the plurality of geothermal heat exchangers within the plurality of wellbores.

13. The method of claim 12, wherein the sidewall is configured to substantially block flow of fluid from the wellhead container to the ground.

14. The method of claim 12, comprising packing material around the wellhead container after the wellhead container is disposed within the recess.

15. The method of claim 12, comprising disposing a plate on the bottom of the recess before disposing the wellhead container within the recess, such that the base of the wellhead container engages the plate.

* * * * *